United States Patent
Yasui (10) Patent No.: US 10,661,772 B2
(45) Date of Patent: May 26, 2020

(54) ELECTRIC BRAKING DEVICE FOR VEHICLE

(71) Applicant: ADVICS CO., LTD., Kariya-shi, Aichi-ken (JP)

(72) Inventor: Yoshiyuki Yasui, Nagoya (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 7 days.

(21) Appl. No.: 16/070,838

(22) PCT Filed: Jan. 18, 2017

(86) PCT No.: PCT/JP2017/001574
§ 371 (c)(1),
(2) Date: Jul. 18, 2018

(87) PCT Pub. No.: WO2017/126560
PCT Pub. Date: Jul. 27, 2017

(65) Prior Publication Data
US 2019/0023248 A1    Jan. 24, 2019

(30) Foreign Application Priority Data
Jan. 22, 2016  (JP) .................................. 2016-010271

(51) Int. Cl.
*F16D 65/00*   (2006.01)
*B60T 13/74*   (2006.01)
(Continued)

(52) U.S. Cl.
CPC .......... B60T 13/741 (2013.01); B60T 7/042 (2013.01); B60T 13/02 (2013.01); F16D 65/18 (2013.01);
(Continued)

(58) Field of Classification Search
CPC .......... B60T 7/02; B60T 7/042; B60T 13/741; B60T 8/17; B60T 8/48; F16D 65/18; H02K 7/102; H02K 7/116
(Continued)

(56) References Cited

U.S. PATENT DOCUMENTS 7,021,415 B2 *   4/2006   Farmer ................. B60T 13/741
                                                                     180/275
7,828,561 B2 *  11/2010   Gueckel ............... H01R 12/585
                                                                     439/751
(Continued)

FOREIGN PATENT DOCUMENTS

JP          2007-278311 A    10/2007

OTHER PUBLICATIONS

International Search Report (PCT/ISA/210) dated Apr. 25, 2017, by the Japan Patent Office as the International Searching Authority for International Application No. PCT/JP2017/001574.
(Continued)

*Primary Examiner* — Christopher P Schwartz
(74) *Attorney, Agent, or Firm* — Buchanan Ingersoll & Rooney PC (57) ABSTRACT

This electric braking device is provided with: an electric motor MTR that, in accordance with an operation amount Bpa of a braking operation member BP caused by the driver of the vehicle, generates a pressing force Fba, being a force pressing a friction member MSB against a rotary member KTB that rotates integrally with a wheel WHL of the vehicle; a caliper CRP fixed to the electric motor MTR; a circuit board KBN to which a microprocessor MPR and a bridge circuit BRG are mounted, such that the electric motor MTR is driven; and a motor pin PMT that feeds power from the circuit board KBN to the electric motor MTR. The motor pin PMT penetrates a holding member HJB and is pressed
(Continued)

into the circuit board KBN, which is fixed to the caliper CRP by the holding member HJB and the motor pin PMT.

3 Claims, 7 Drawing Sheets

(51) Int. Cl.
    *B60T 7/04*          (2006.01)
    *B60T 13/02*        (2006.01)
    *F16D 65/18*        (2006.01)
    *F16D 55/226*      (2006.01)
    *F16D 121/18*      (2012.01)
    *F16D 66/00*       (2006.01)
    *F16D 121/24*      (2012.01)

(52) U.S. Cl.
    CPC .......... *F16D 55/226* (2013.01); *F16D 65/183* (2013.01); *F16D 2066/005* (2013.01); *F16D 2121/18* (2013.01); *F16D 2121/24* (2013.01)

(58) Field of Classification Search
    USPC .......... 188/1.11 E, 2 D, 72.6–72.8, 196 BA, 188/156–164; 303/20
    See application file for complete search history.

(56) References Cited

U.S. PATENT DOCUMENTS

| | | | |
|---|---|---|---|
| 9,663,089 B2* | 5/2017 | Yasui | F16D 55/227 |
| 2007/0228824 A1 | 10/2007 | Yasukawa et al. | |
| 2011/0183529 A1* | 7/2011 | Heise | H01R 13/33 439/1 |
| 2015/0323027 A1* | 11/2015 | Bourlon | B60T 13/741 188/162 |
| 2019/0016325 A1* | 1/2019 | Yasui | F16D 65/18 |

OTHER PUBLICATIONS

Written Opinion (PCT/ISA/237) dated Apr. 25, 2017, by the Japan Patent Office as the International Searching Authority for International Application No. PCT/JP2017/001574.

\* cited by examiner

ELECTRIC BRAKING DEVICE FOR VEHICLE

TECHNICAL FIELD

The present invention relates to an electric braking device for a vehicle.

BACKGROUND ART

Patent Literature 1 describes "an electric braking device having an integrated structure with an electric circuit unit, in which, with an aim to improve countermeasures of this driving circuit against heat, an electric circuit unit DCP is provided facing a brake pad with a motor therebetween, a power module 408 is provided so that an inner surface of a metal outer casing 500 of the electric circuit unit DCP faces a heat dissipating surface, and a control circuit board 404 is provided on a motor side relative to the power module 408".

An electric braking device is accommodated in a tire wheel, and is mounted therein by being fixed to a wheel side. Thus, vibration input from a road surface is directly applied to the device, so respective constituent elements thereof are required to have high vibration resistance. Especially, since an electric circuit board is thin plate-shaped, resonance phenomenon occurs due to warping of this thin plate, and vibration might thereby be amplified. To suppress this vibration amplification, the circuit board needs to be fixed firmly to a caliper. However, to firmly fix the circuit board, the circuit board must be fixed at plural points, and a size increase of the device becomes a concern.

CITATIONS LIST

Patent Literature

Patent Literature 1: JP 2007-278311 A

SUMMARY OF INVENTION

Technical Problems

The present invention aims to provide an electric braking device for a vehicle which enables to firmly fix an electric circuit board to a caliper using a simple configuration and to suppress vibration amplification caused by resonance of the electric circuit board.

Solutions to Problems

An electric braking device for a vehicle according to the present invention includes: an electric motor (MTR) configured to generate a pressing force (Fba) in accordance with an operation amount (Bpa) of a braking operation member (BP) by a driver of the vehicle, the pressing force being a force for pressing a friction member (MSB) against a rotary member (KTB) that rotates integrally with a wheel (WHL) of the vehicle; a caliper (CRP) configured to fix the electric motor (MTR); a circuit board (KBN) configured to implement a microprocessor (MPR) and a bridge circuit (BRG) so as to drive the electric motor (MTR); and a motor pin (PMT) configured to supply power to the electric motor (MTR) from the circuit board (KBN).

In the electric braking device for a vehicle according to the present invention, the motor pin (PMT) is press-fitted to the circuit board (KBN) by penetrating through a holding member (HJB), and the circuit board (KBN) is fixed to the caliper (CRP) by the holding member (HJB) and the motor pin (PMT).

An electric braking device for a vehicle according to the present invention includes: an electric motor (MTR) configured to generate a pressing force (Fba) in accordance with an operation amount (Bpa) of a braking operation member (BP) by a driver of the vehicle, the pressing force being a force for pressing a friction member (MSB) against a rotary member (KTB) that rotates integrally with a wheel (WHL) of the vehicle; a caliper (CRP) configured to fix the electric motor (MTR); a pressing force sensor (FBA) configured to detect the pressing force (Fba); a circuit board (KBN) configured to implement a microprocessor (MPR) and a bridge circuit (BRG) so as to drive the electric motor (MTR) based on the pressing force (Fba); and a pressing force pin (PFB) configured to send a signal of the pressing force (Fba) from the pressing force sensor (FBA) to the circuit board (KBN) and configured to supply power from the circuit board (KBN) to the pressing force sensor (FBA).

In the electric braking device for a vehicle according to the present invention, the pressing force pin (PFB) is press-fitted to the circuit board (KBN) by penetrating through a holding member (HJB), and the circuit board (KBN) is fixed to the caliper (CRP) by the holding member (HJB) and the pressing force pin (PFB).

An electric braking device for a vehicle according to the present invention includes: an electric motor (MTR) configured to generate a pressing force (Fba) in accordance with an operation amount (Bpa) of a braking operation member (BP) by a driver of the vehicle, the pressing force being a force for pressing a friction member (MSB) against a rotary member (KTB) that rotates integrally with a wheel (WHL) of the vehicle; a caliper (CRP) configured to fix the electric motor (MTR); a rotation angle sensor (MKA) configured to detect a rotation angle (Mka) of the electric motor (MTR); a circuit board (KBN) configured to implement a microprocessor (MPR) and a bridge circuit (BRG) so as to drive the electric motor (MTR) based on the rotation angle (Mka), and a rotation angle pin (PMK) configured to send a signal of the rotation angle (Mka) from the rotation angle sensor (MKA) to the circuit board (KBN) and configured to supply power from the circuit board (KBN) to the rotation angle sensor (MKA).

In the electric braking device for a vehicle according to the present invention, the rotation angle pin (PMK) is press-fitted to the circuit board (KBN) by penetrating through a holding member (HJB), and the circuit board (KBN) is fixed to the caliper (CRP) by the holding member (HJB) and the rotation angle pin (PMK).

According to the above configurations, the holding member HJB and the pins PMT, PMK, and PFB fix the circuit board KBN to the caliper CRP. That is, the pins PMT, PMK, and PFB are used for fixation of the circuit board KBN in addition to power supply and signal transmission. Thus, the circuit board KBN is attached to the caliper CRP with such simple configurations and at improved sturdiness, and as such, vibration resistance of the circuit board KBN itself as well as electronic components (such as the processor MPR) can be improved.

DESCRIPTION OF EMBODIMENTS

Hereinbelow, an electric braking device for a vehicle according to an embodiment of the present invention will be described with reference to the drawings.

Figure 1:
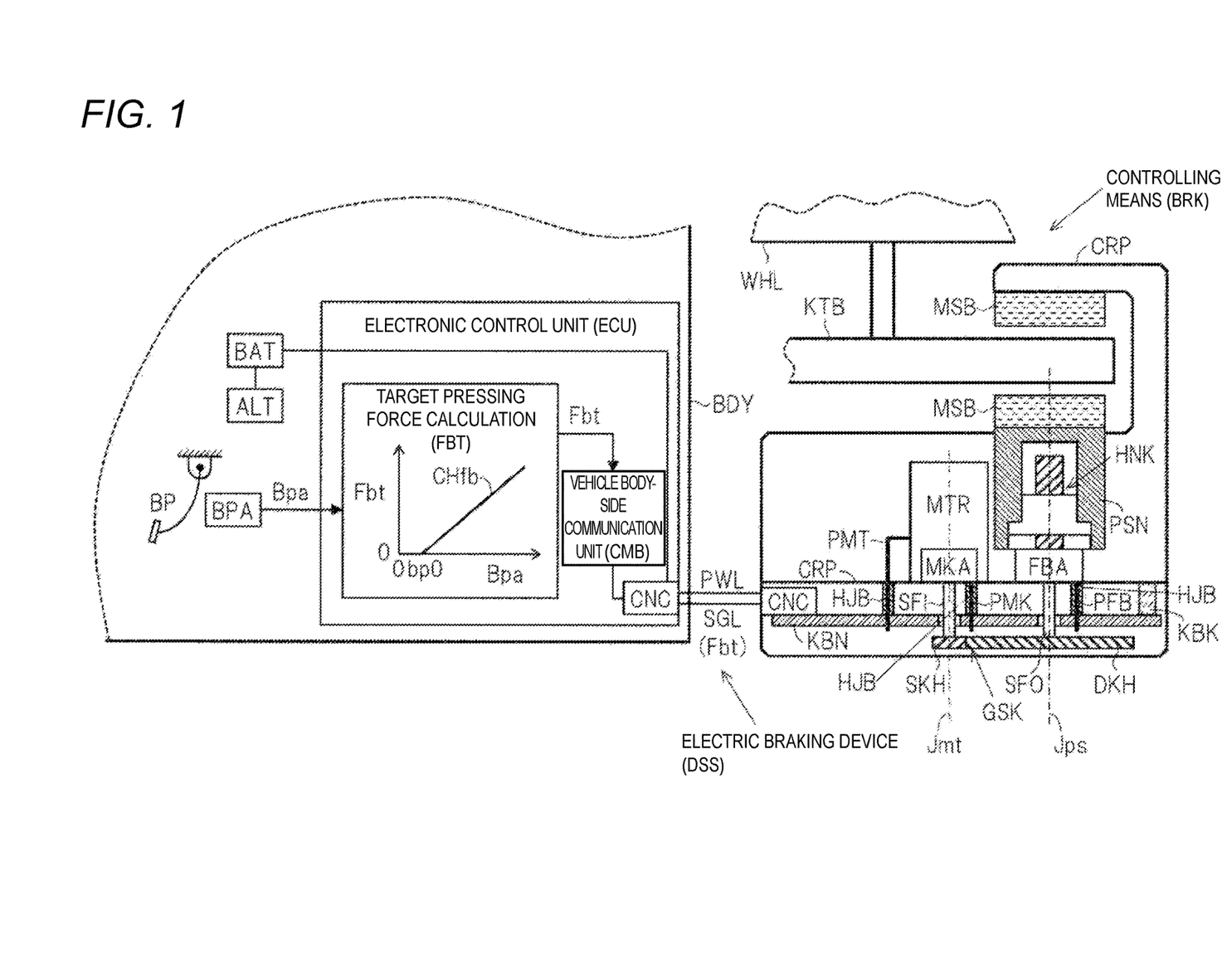
FIG. 1 An overall configuration diagram of an electric braking device for a vehicle according to an embodiment of the present invention.

Overall Configuration of Electric Braking Device for Vehicle According to an Embodiment of the Present Invention An electric braking device DSS according to an embodiment of the present invention will be described with reference to an overall configuration diagram of FIG. 1. A vehicle is provided with the electric braking device DSS, a braking operation member BP, an operation amount acquiring means BPA, a rotary member (for example, a brake disk or a brake drum) KTB, and friction members (for example, brake pads or brake shoes) MSB. The electric braking device DSS is configured of an electronic control unit ECU, a communication line SGL, power lines PWL, and a braking means BRK.

The braking operation member (for example, a brake pedal) BP is a member that a driver operates to decelerate the vehicle. Braking torque of a wheel WHL is adjusted by the braking means BRK according to the operation of the braking operation member BP. As a result, a braking force is generated in the wheel WHL, and the running vehicle is thereby decelerated.

The braking operation member BP is provided with the operation amount acquiring means BPA. The operation amount acquiring means BPA allows an operation amount (braking operation amount) Bpa of the braking operation member BP to be acquired (detected). As the operation amount acquiring means BPA, at least one of a sensor (pressure sensor) that detects a pressure of a master cylinder, a sensor (pedaling sensor) that detects an operation force on the braking operation member BP, and a sensor (stroke sensor) that detects an operation displacement of the braking operation member BP is employed. Thus, the braking operation amount Bpa is calculated based on at least one of the master cylinder pressure, the brake pedaling force, and the brake pedal stroke. The detected braking operation amount Bpa is input to the electronic control unit ECU.

Electronic Control Unit ECU

The electronic control unit ECU is configured of a target pressing force calculation block FBT, a vehicle body-side communication unit CMB, and a connector CNC. The electronic control unit ECU corresponds to a part of a control means (controller) CTL.

In the target pressing force calculation block FBT, a target value (target pressing force) Fbt related to a force by which the friction members MSB press the rotary member KTB (pressing force) is calculated. Specifically, the target pressing force Fbt is calculated based on the braking operation amount Bpa and a preset calculation map CHfb so that the target pressing force Fbt exhibits a monotonic increase from zero as the braking operation amount Bpa increases.

The target pressing force Fbt is inputted to the vehicle body-side communication unit CMB. In the vehicle body-side communication unit CMB, signals (such as Fbt, etc.) are sent and received to and from the circuit board KBN (especially the wheel-side communication unit CMW) in the braking means BRK through the communication line SGL, and the connector CNC. The communication line SGL connected by the connector CNC is a communication means between the electronic control unit ECU fixed to a vehicle body and the braking means BRK fixed to the wheel. A serial communication bus (for example, a CAN bus) may be used as the signal line SGL. Further, power lines PWL are connected to the connector CNC. Electricity is supplied to the braking means BRK from the electronic control unit ECU by the power lines PWL.

Braking Means (Brake Actuator) BRK

The braking means BRK is provided on the wheel WHL, and is configured to apply braking torque to the wheel WHL to generate a braking force. The running vehicle is decelerated by the braking means BRK. As the braking means BRK, a configuration of a so-called disk-type braking device (disk brake) is exemplified. In this case, the friction members MSB are brake pads and the rotary member KTB is a brake disk. The braking means BRK may be a drum type braking device (drum brake). In a case of the drum brake, the friction members MSB are brake shoes and the rotary member KTB is a brake drum.

The braking means BRK (brake actuator) is configured of a brake caliper CRP, a pressing member PSN, an electric motor MTR, a rotation angle sensor MKA, a reduction gear GSK, an input member (input shaft) SFI, an output member (output shaft) SFO, a power converting mechanism HNK, a pressing force sensor FBA, and a driving circuit board KBN. The respective members as above (PSN and the like) are accommodated inside the brake caliper CRP.

As the brake caliper CRP (which may simply be termed a caliper), a floating type caliper may be employed. The caliper CRP is configured to interpose the rotary member (brake disk) KTB between two friction members (brake pads) MSB. The pressing member (brake piston) PSN is moved (frontward or rearward) relative to the rotary member KTB in the caliper CRP. Movement of the pressing member PSN presses the friction members MSB against the rotary member KTB, and a friction force is thereby generated. A part of the caliper CRP is configured by a box-shaped structure. Specifically, the caliper CRP includes a space (space) therein, and respective members (circuit board KBN, etc.) are accommodated in this space.

The movement of the pressing member PSN is performed by power from the electric motor MTR. Specifically, an output of the electric motor MTR (rotary power about the rotary axis) is transmitted from the input member (input shaft) SFI to the output member (output shaft) SFO via the reduction gear GSK. Then, rotary power (torque) of the output member SFO is converted to linear power (thrust force in an axial direction of the pressing member PSN) by the power converting mechanism HNK (for example, screw mechanism), and transmitted to the pressing member PSN. As a result, the pressing member PSN is thereby moved relative to the rotary member KTB. The movement of the pressing member PSN adjusts a force (pressing force) by which the friction members MSB press the rotary member KTB. Since the rotary member KTB is fixed to the wheel WHL, the friction force is generated between the friction members MSB and the rotary member KTB, and a braking force for the wheel WHL is thereby adjusted.

The electric motor MTR is a power source for driving (moving) the pressing member (piston) PSN. For example, as the electric motor MTR, a motor with brush, or a brushless motor may be employed. In rotation directions of the electric motor MTR, a forward direction corresponds to a direction along which the friction members MSB approach the rotary member KTB (direction by which the pressing force increases and the braking torque increases), and a reverse direction corresponds to a direction along which the friction members MSB separate away from the rotary member KTB (direction by which the pressing force decreases and the braking torque decreases).

The rotation angle sensor MKA acquires (detects) a position (rotation angle) Mka of a rotor (rotor) of the electric motor MTR. The detected rotation angle Mka is inputted to the circuit board KBN through rotation angle pins PMK.

The pressing force sensor FBA acquires (detects) a force (pressing force) Fba by which the pressing member PSN presses the friction members MSB. The detected pressing force (detected value) Fba is inputted to the circuit board KBN via pressing force pins PFB. For example, the pressing force sensor FBA is provided between the power converting mechanism HNK and the caliper CRP in the output member SFO.

The driving circuit board (which may simply be termed a circuit board) KBN is an electric circuit configured to drive the electric motor MTR. The circuit board KBN is configured of hardware components such as a microprocessor (which is a calculation processing device, which may simply be termed a processor) MPR and a bridge circuit BRG and control algorithms (software) programmed in the microprocessor MPR. The electric motor MTR and the circuit board KBN are electrically connected via motor pins PMT (power supply pins for the electric motor MTR). The circuit board KBN is fixed to the caliper CRP and is arranged between the electric motor MTR and the reduction gear GSK. The circuit board KBN corresponds to a part of a control means (controller) CTL.

The connector CNC is fixed to the circuit board KBN. Output torque (rotary power) of the electric motor MTR is controlled based on the target pressing force Fbt sent from the electronic control unit ECU via the signal line SGL. Further, electricity transmitted from the electronic control unit ECU through the power lines PWL is inputted to the circuit board KBN via the connector CNC. This electricity is the power source of the electric motor MTR and is also the power sources for the rotation angle sensor MKA and the pressing force sensor FBA.

First Embodiment of Driving Circuit Board KBN

Figure 2:
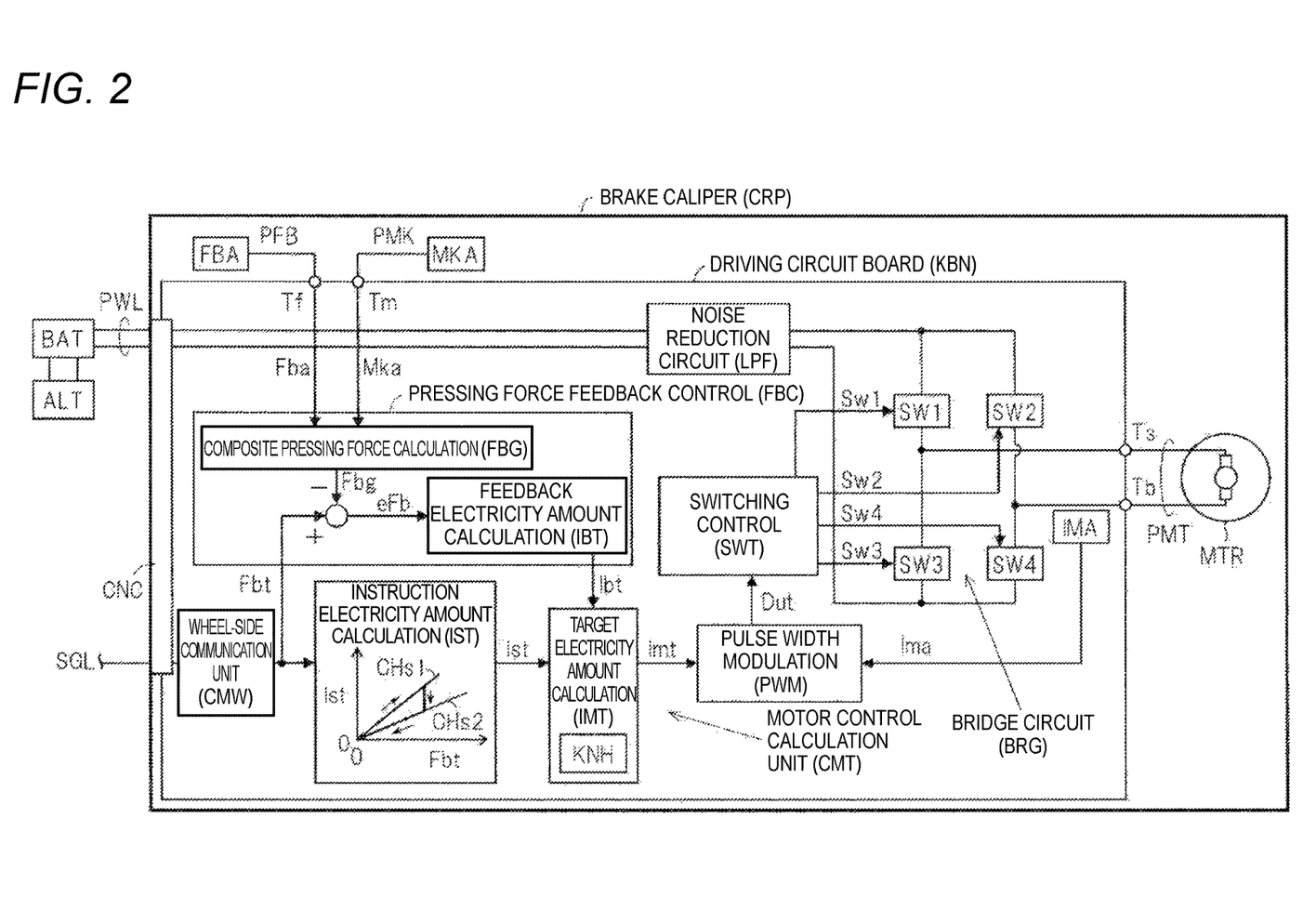
FIG. 2 A schematic diagram for explaining a first embodiment of a driving circuit board.

A first embodiment of the driving circuit board (which may simply be termed the circuit board) KBN will be described with reference to a schematic diagram of FIG. 2. This is an example where a motor with brush (which may simply be termed a brush motor) is employed as the electric motor MTR. The electric motor MTR is driven by the circuit board KBN.

The electric motor (brush motor) MTR is electrically connected to the circuit board KBN by the motor pins PMT. The circuit board KBN is provided with two through holes (through holes) Ts, Tb for the pins PMT, where the two motor pins PMT are press-fitted in the two through holes Ts, Tb, by which the electrically connected state is established. Specifically, as terminals of the motor pins PMT, press-fit connectors (press-fit terminals) are employed.

The acquired result (motor rotation angle) Mka of the rotation angle sensor MKA is inputted to the circuit board KBN through the rotation angle pins PMK. The circuit board KBN is provided with through holes Tm for the rotation angle pins PMK, where the pins PMK are press-fitted to the through holes Tm and an electric connection state is thereby formed. Specifically, press-fit connectors are employed as terminals of the rotation angle pins PMK.

Similarly, the acquired result (actual pressing force) Fba of the pressing force sensor FBA is inputted to the circuit board KBN by the pressing force pins PFB. The circuit board KBN is provided with through holes (through holes) Tf for the pressing force pins PFB, where the pins PFB are press-fitted to the through holes Tf and an electric connection state is thereby formed. Specifically, press-fit connectors are employed as the terminals of the pressing force pins PFB.

Here, the "press-fit connector (press-fit terminal)" is an electric connection that does not use solder. The pin terminal (press-fit portion) is inserted to the through hole (through hole) formed in the circuit board (printed substrate) KBN. Then, electric conduction is realized by an outer circumference of the press-fit terminal and an inner circumference of the through hole contacting each other. That is, a terminal portion (press-fitting portion) of the pin is press-fitted into the printed substrate, and contact electric conduction is realized by an elastic force generated by elastic deformation that takes place thereupon. Due to this, a compliant shape that provides the pin terminal with deformability, and for example, a shape may be employed in which a cutout is formed in the pin terminal and warping is generated at this cutout.

The circuit board KBN is configured of the connector CNC, the wheel-side communication unit CMW, a motor control calculation unit CMT, a bridge circuit BRG, and a noise reduction filter (which may also be termed a noise reduction circuit) LPF. The circuit board KBN is fixed to the caliper CRP.

The circuit board (electric circuit board for driving the motor) KBN has the connector CNC fixed thereto. The connector CNC connects the power lines PWL and the signal line SGL between the electronic control unit ECU and the braking means BRK. Power is supplied to the circuit board KBN from a rechargeable battery BAT and a dynamo ALT fixed to the vehicle side through power lines PWL. Further, the target pressing force Fbt is inputted to the circuit board KBN (especially the wheel-side communication unit CMW) from the vehicle body-side electronic control unit ECU (especially the vehicle body-side communication unit CMB) through the signal line (communication bus) SGL.

The wheel-side communication unit CMW of the circuit board KBN is configured to receive the target value Fbt of the pressing force via the signal line SGL from the vehicle body-side communication unit CMB of the electronic control unit ECU. The wheel-side communication unit CMW is a communication protocol, and is incorporated in the microprocessor (which may simply be termed a processor) MPR implemented on the circuit board KBN.

Motor Control Calculation Unit CMT

In the motor control calculation unit CMT, the amount of electricity of the electric motor MTR (that is, the output torque of the electric motor MTR) and an electricity application direction (that is, the rotation direction of the electric motor MTR) are controlled to drive the electric motor MTR. The motor control calculation unit CMT is configured of an instruction electricity amount calculation block IST, a pressing force feedback control block FBC, a target electricity amount calculation block IMT, a pulse width modulation block PWM, and a switching control block SWT. The motor control calculation unit CMT is a control algorithm, and is programmed in the processor MPR implemented on the circuit board KBN.

The instruction electricity amount calculation block IST calculates an instruction electricity amount Ist based on the target pressing force Fbt and preset calculation characteristics (calculation map) CHs1, CHs2. The instruction electricity amount Ist is a target value of the amount of electricity supplied to the electric motor MTR to achieve the target pressing force Fbt. Specifically, the instruction electricity amount Ist is calculated such that it increases monotonically as the target pressing force Fbt increases. Here, the calculation map of the instruction electricity amount Ist is configured of two characteristics CHs1, CHs2 by considering hysteresis of the braking means BRK.

Here, the "amount of electricity" is a state quantity (variable) for controlling the output torque of the electric motor MTR. Since the electric motor MTR outputs the torque that is substantially proportional to current, a current target value of the electric motor MTR may be used as the target value of the amount of electricity. Further, since the current increases as a result of increasing a supplied voltage to the electric motor MTR, a supplied voltage value may be used as the target electricity amount. Moreover, since the supplied voltage value may be modulated by a duty ratio in pulse width modulation, this duty ratio may be used as the amount of electricity.

The pressing force feedback control block FBC calculates a pressing force feedback electricity amount (which may simply be termed a feedback electricity amount) Ibt based on the target pressing force (target value) Fbt, the actual pressing force (detected value) Fba, and the motor rotation angle (detected value) Mka. The pressing force feedback control block FBC is configured of a composite pressing force calculation block FBG and a feedback electricity amount calculation block IBT.

In the composite pressing force calculation block FBG, a composite pressing force Fbg is calculated based on the actual pressing force (detected value) Fba and the actual motor rotation angle (detected value) Mka. The composite pressing force Fbg is a value in which the actual value of the pressing force is calculated at a higher precision than the detected value Fba. A calculation method in the composite pressing force calculation block FBG will be described later.

Next, in the pressing force feedback control block FBC, a deviation (pressing force deviation) eFb (=Fbt−Fbg) between the target pressing force Fbt and the composite pressing force Fbg is calculated. The pressing force feedback electricity amount Ibt is calculated in the feedback electricity amount calculation block IBT within the pressing force feedback control block FBC based on the pressing force deviation eFb so that the target value Fbt and the composite value (actual value) Fbg of the pressing force match each other.

Specifically, a proportional gain (predetermined value) Kp is multiplied to the pressing force deviation eFb to determine a proportional term of the feedback electricity amount Ibt. Further, a derivative value of the pressing force deviation eFb is calculated, to which a derivative gain (predetermined value) Kd is multiplied, and a derivative term of the feedback electricity amount Ibt is thereby calculated. Further, an integrated value of the pressing force deviation eFb is calculated, to which an integration gain (predetermined value) Ki is multiplied, and an integration term of the feedback electricity amount Ibt is thereby calculated. Then, the proportional term, the derivative term, and the integration term of the feedback electricity amount Ibt are added to determine a finalized feedback electricity amount Ibt. That is, in the pressing force feedback control block FBC, a so-called feedback control based on the pressing force (PID control) is executed and the feedback electricity amount Ibt is determined thereby.

In the target electricity amount calculation block IMT, a target electricity amount Imt, which is a finalized target value for the electric motor MTR, is calculated. The instruction electricity amount Ist is calculated as a value corresponding to the target pressing force Fbt; however, a difference may be generated between the target pressing force and the actual pressing force due to changes in efficiency of a power transmission member of the braking means BRK. Therefore, the target electricity amount Imt is determined such that the instruction electricity amount Ist is adjusted by the feedback electricity amount Ibt to decrease the aforementioned difference. Specifically, the target electricity amount Imt is calculated by adding the feedback electricity amount Ibt to the instruction electricity amount Ist.

The rotation direction of the electric motor MTR is determined according to a sign of the target electricity amount Imt (the value thereof being positive or negative), and the output (rotational force) of the electric motor MTR is controlled based on a magnitude of the target electricity amount Imt. For example, in a case where the sign of the target electricity amount Imt is a positive sign (Imt>0), the electric motor MTR is driven in the forward direction (pressing force increasing direction), and in a case where the sign of the target electricity amount Imt is a negative sign (Imt<0), the electric motor MTR is driven in the reverse direction (pressing force decreasing direction). Further, the output torque of the electric motor MTR is controlled to be larger when an absolute value of the target electricity amount Imt is larger, and the output torque is controlled to be smaller when the absolute value of the target electricity amount Imt is smaller.

In the pulse width modulation block PWM, an instruction value (target value) Dut for performing the pulse width modulation is calculated based on the target electricity amount Imt. Specifically, in the pulse width modulation block PWM, a pulse width duty ratio Dut (rate of the on-state within a cycle in periodic pulse waves) is determined based on the target electricity amount Imt and a preset characteristic (calculation map). Together with the above, in the pulse width modulation block PWM, the rotation direction of the electric motor MTR is determined based on the sign of the target electricity amount Imt (the positive sign or the negative sign). For example, the rotation direction of the electric motor MTR is set such that the forward direction is a positive (plus) value and the reverse direction is a negative (minus) value. Since a finalized output voltage is determined according to an input voltage (power source voltage) and the duty ratio Dut, the rotation direction of the electric motor MTR and the amount of electricity supplied to the electric motor MTR (that is, the output of the electric motor MTR) are determined in the pulse width modulation block PWM.

Moreover, in the pulse width modulation block PWM, a so-called current feedback control is executed. The detected value (for example, the actual current value) Ima of the electricity amount acquiring means IMA is inputted to the pulse width modulation block PWM, and the duty ratio Dut is corrected (slightly adjusted) based on a deviation (electricity amount deviation) eIm between the target electricity amount Imt and the actual electricity amount Ima. The target value Imt and the actual value Ima are controlled to match each other in this current feedback control, by which a highly accurate motor control can be achieved.

In the switching control block SWT, signals (driving signals) Sw1 to Sw4 for driving switching elements SW1 to SW4 configuring the bridge circuit BRG are determined based on the duty ratio (target value) Dut. The driving signals Sw1 to Sw4 are determined such that an electricity application time per unit time becomes longer for larger duty ratios Dut, and larger current is thereby flown in the electric motor MTR. By these driving signals Sw1 to Sw4, electricity application/nonapplication and the electricity application time per unit time in each of the switching elements SW1 to SW4 are controlled. That is, the rotation direction and the output torque of the electric motor MTR are controlled by the driving signals Sw1 to Sw4. As above, the motor control calculation unit CMT has been described.

The bridge circuit BRG is a circuit that does not require bidirectional power sources, and by which the electricity application direction to the electric motor is changed by a single power source, and the rotation direction (the forward direction or the reverse direction) of the electric motor can thereby be controlled. The bridge circuit BRG is configured of the switching elements SW1 to SW4, and is implemented on the circuit board KBN. The switching elements SW1 to SW4 are elements that can turn on (apply electricity to) or turn off (not apply electricity to) a part of an electric circuit. For example, MOS-FETs and IGBTs may be used as the switching elements SW1 to SW4.

In the case where the electric motor MTR is driven in the forward direction, the switching elements SW1, SW4 are brought to the electricity applied state (on-state) and the switching elements SW2, SW3 are brought to the electricity nonapplied state (off-state). To the contrary, in the case where the electric motor MTR is driven in the reverse direction, the switching elements SW1, SW4 are brought to the electricity nonapplied state (off-state) and the switching elements SW2, SW3 are brought to the electricity applied state (on-state). That is, in a reverse drive of the electric motor MTR, the current is flown in a direction opposite to that for a forward drive.

The electricity amount acquiring means (for example, a current sensor) IMA for the electric motor is provided in the bridge circuit BRG. The electricity amount acquiring means IMA acquires the amount of electricity (actual value) Ima of the electric motor MTR. For example, a value of the current actually flowing in the electric motor MTR may be detected as the actual electricity amount Ima by the motor current sensor IMA.

The noise reduction filter (which may also be termed the noise reduction circuit) LPF is implemented on the circuit board KBN for stabilizing supplied electricity. The noise reduction circuit LPF is configured by combining at least one condenser (capacitor) and at least one inductor (coil). The noise reduction circuit LPF is a stabilizer circuit for reducing voltage fluctuation and the like, and is a so-called LC circuit (which may also be termed an LC filter).

Composite Pressing Force Calculation Block FBG

Figure 3:
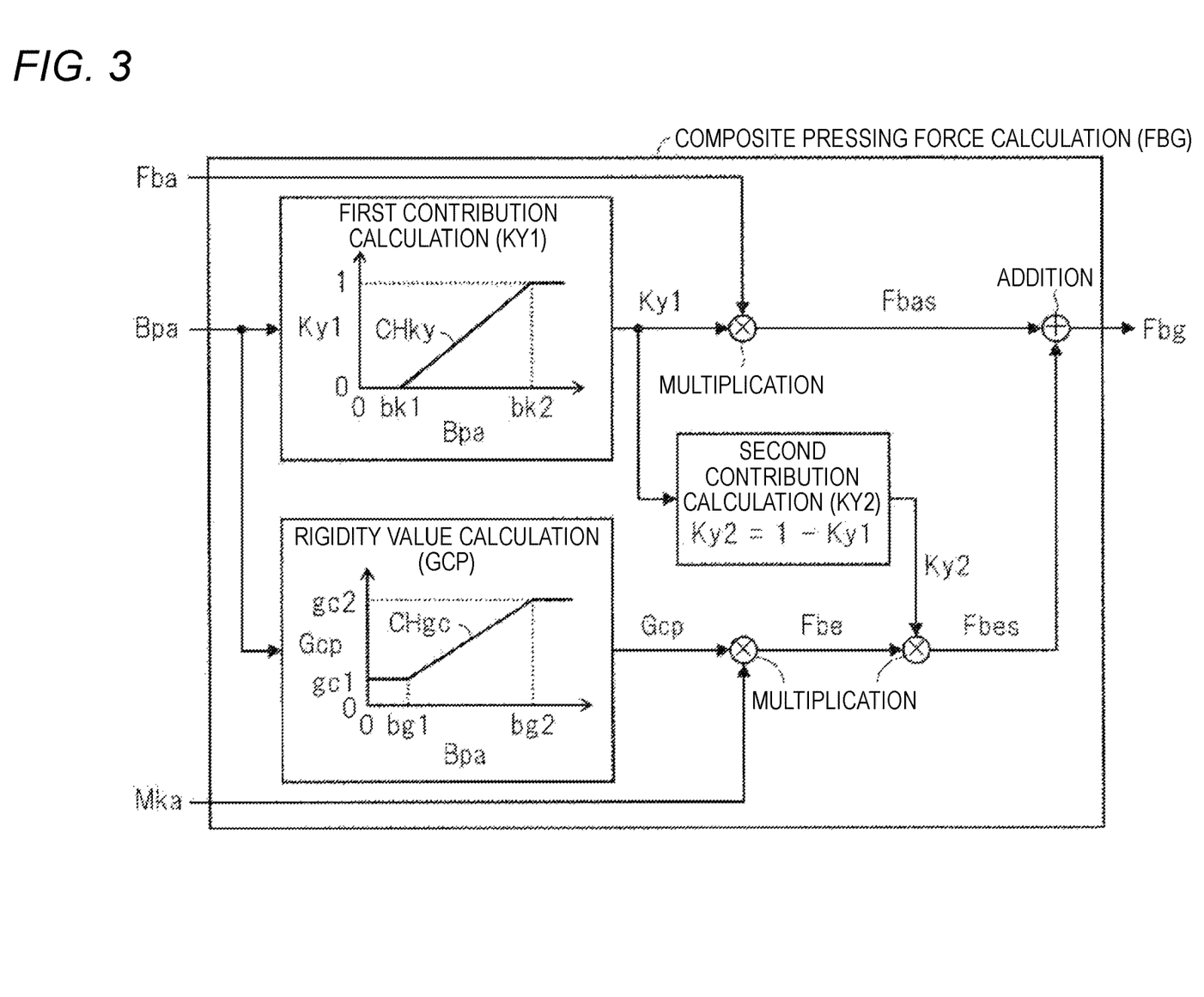
FIG. 3 A functional block diagram for explaining a composite pressing force calculation block.

Details of the composite pressing force calculation block FBG will be described with reference to a functional block diagram of FIG. 3. The composite pressing force calculation block FBG is configured of a first contribution calculation block KY1, a second contribution calculation block KY2, and a rigidity value calculation block GCP. In the composite pressing force calculation block FBG, the composite pressing force (calculation value) Fbg is calculated based on the detected value Fba of the pressing force sensor FBA and the detected value Mka of the rotation angle sensor MKA. Here, the composite pressing force Fbg is the high-precision actual value of the pressing force in which the precision of the detected value Fba is compensated by the detected value Mka.

In the first contribution calculation block KY1, a first contribution Ky1 is calculated based on the braking operation amount Bpa. The first contribution Ky1 is a coefficient that determines a degree of an influence of the detected value Fba of the pressing force sensor FBA in the calculation of the composite pressing force Fbg. The first contribution Ky1 is calculated based on the braking operation amount Bpa and a calculation characteristic (calculation map) CHky. The first contribution Ky1 is calculated as "0" in a case where the operation amount Bpa is less than a predetermined value bk1, and the first contribution Ky1 is increased from "0" to "1" (monotonic increase) in accordance with an increase in the operation amount Bpa in a case where the operation amount Bpa is equal to or greater than the predetermined value bk1 and less than a predetermined value bk2 (>bk1). In a case where the operation amount Bpa is equal to or greater than the predetermined value bk2, the first contribution Ky1 is calculated as "1". Here, the detected pressing force Fba is not used in the calculation of the composite pressing force Fbg in the case of Ky1=0.

In the second contribution calculation block KY2, the second contribution Ky2 is calculated based on the first contribution Ky1. Specifically, the second contribution Ky2 is determined by an equation "Ky2=1−Ky1". Here, in a case of Ky2=0, an estimated pressing force Fbe is not used in the calculation of the composite pressing force Fbg.

In the rigidity value calculation block GCP, a rigidity value Gcp is calculated based on the braking operation amount Bpa. The rigidity value Gcp corresponds to a rigidity (spring constant) of the entire braking means. That is, the rigidity value Gcp represents the spring constant as a serial spring configured of the caliper CRP and the friction members MSB. The rigidity value Gcp is calculated based on the braking operation amount Bpa and rigidity characteristics (calculation map) CHgc. Here, the rigidity characteristics CHgc are characteristics for estimating the rigidity value Gcp based on the operation amount Bpa. In a case where the operation amount Bpa is less than a predetermined value bg1, the rigidity value Gcp is calculated as a predetermined value gc1, and in a case where the operation amount Bpa is equal to or greater than the predetermined value bg1 and less than a predetermined value bg2 (>bg1), the rigidity value Gcp is increased (monotonic increase) from the predetermined value gc1 to a predetermined value gc2 (>gc1) according to the increase in the operation amount Bpa. In a case where the operation amount Bpa is equal to or greater than the predetermined value bg2, the rigidity value Gcp is calculated as a predetermined value gc2.

The estimated value Fbe of the pressing force is calculated based on the rigidity value Gcp and the rotation angle Mka of the electric motor MTR. The pressing force estimated value Fbe is the pressing force estimated from the rotation angle Mka. Specifically, the estimated value Fbe of the pressing force is calculated by multiplying the actual rotation angle Mka of the electric motor MTR to the rigidity value Gcp representing the spring constant of the entire braking means.

A detected value component Fbas being a component of the detected value Fba in the composite pressing force Fbg is calculated based on the pressing force detected value (detected value of the pressing force sensor FBA) Fba and the first contribution Ky1. The detected value component Fbas is a component of the pressing force detected value Fba in which a degree of influence thereof is taken into consideration by the first contribution Ky1. Specifically, it is determined by multiplying the coefficient Ky1 to the pressing force actual value Fba (that is, Fbas=Ky1×Fba).

An estimated value component Fbes being a component of the estimated value Fbe in the composite pressing force Fbg is calculated based on the pressing force estimated value (pressing force estimated based on Mka) Fbe and the second contribution Ky2. The estimated value component Fbes is a component of the pressing force estimated value Fbe in which a degree of influence thereof is taken into consideration by the second contribution Ky2. Specifically, it is determined by multiplying the coefficient Ky2 to the pressing force estimated value Fbe (that is, Fbes=Ky2×Fbe=Ky2×Gcp×Mka).

Further, the component (detected value component) Fbas of the pressing force detected value Fba and the component (estimated value component) Fbes of the pressing force estimated value Fbe are added, and the composite pressing force Fbg is thereby calculated (that is, Fbg=Fbas+Fbes=Ky1×Fba+Ky2×Fbe). That is, the composite pressing force Fbg is the actual value of the pressing force with high precision that is calculated by reflecting the degree of influences of the detected value Fba and the estimated value Fbe according to a magnitude of the operation amount Bpa.

The detected value Fba of the pressing force is obtained by an element that detects "distortion (deformation caused upon when a force is applied)" (distortion detecting element). Generally, an analog signal is sent from the distortion detecting element, which is subjected to analog-digital conversion (AD conversion) and taken into the processor MPR. Since the detected value Fba is inputted to the processor MPR through analog-digital converting means ADH, a resolution (resolving power) of the pressing force detection is dependent on a performance (resolution) of the AD conversion. On the other hand, the actual position (rotation angle) of the electric motor is taken into the processor MPR as a digital signal from a Hall IC or a resolver. Further, the output of the electric motor is decelerated by the reduction gear GSK and the like and is converted to the pressing force. Due to this, the pressing force estimated value Fbe calculated from the rotation angle Mka of the electric motor MTR as acquired by the rotation angle sensor MKA has a higher pressing power resolution (resolving power) than the pressing force detected value Fba acquired by the pressing force acquiring means FBA. On the other hand, the pressing force estimated value Fbe is calculated based on the rigidity (spring constant) Gcp of the actuator BRK. Since the rigidity value Gcp varies depending on a state of wear in the friction members MSB, the pressing force detected value Fba has a higher reliability than the pressing force estimated value Fbe (its error from a true value is smaller).

Further, the characteristics of the pressing force Fba relative to the position Mka of the electric motor (that is, a change in the spring constant of the entire braking device) are nonlinear, and exhibit a shape that "protrude downward". Due to this, in a region where the pressing force is large, pressing force detection sensitivity (amount of change in the pressing force according to displacement) is sufficiently high, so the pressing force detected value Fba can be used in the pressing force feedback control. However, in a region where the pressing force is small, the detection sensitivity of the pressing force detected value Fba becomes lower, so it is preferable to employ the pressing force estimated value Fbe in addition to (or as a substitution of) the pressing force detected value Fba in the pressing force feedback control.

According to the above findings, the first contribution Ky1 is calculated as a relatively small value and the second contribution Ky2 is calculated as a relatively large value in the case where the braking operation amount Bpa is small. As a result, in the region where the pressing force is small, where a fine braking torque adjustment is required (that is, a region where the braking operation amount is small and the braking toque is small), the resolution (the least significant bit, LSB thereof) of the detection of the generating pressing fore is improved, and precise pressing force feedback control can be executed. Further, in the case where the braking operation amount Bpa is large, the first contribution Ky1 is calculated as a relatively large value and the second contribution Ky2 is calculated as a relatively small value, by which the degree of the influence of the pressing force estimated value Fbe estimated from the rotation angle Mka is reduced and the degree of the influence of the actually-detected pressing force detected value Fba is increased. As a result, in the region where the pressing force is large, where a relationship of the vehicle deceleration relative to the braking operation amount Bpa is required to be constant (that is, in the region where the braking operation amount is large and the braking torque is large), the highly reliable pressing force feedback control (that is, based on the pressing force with small error from the true value) can be executed.

Furthermore, the in the case where the braking operation amount Bpa is smaller than the predetermined operation amount (predetermined value) bk1, the first contribution Ky1 may be set to zero. Further, in the case where the braking operation amount Bpa is greater than the predetermined operation amount (predetermined value) bk2, the second contribution Ky2 is calculated to zero. Thus, the resolution of the pressing force feedback control in the region where the operation amount Bpa is small (braking torque is small) can be improved, and the reliability of the pressing force feedback control in the region where the operation amount Bpa is large (braking torque is large) can be improved.

Second Embodiment of Driving Circuit Board KBN

Figure 4:
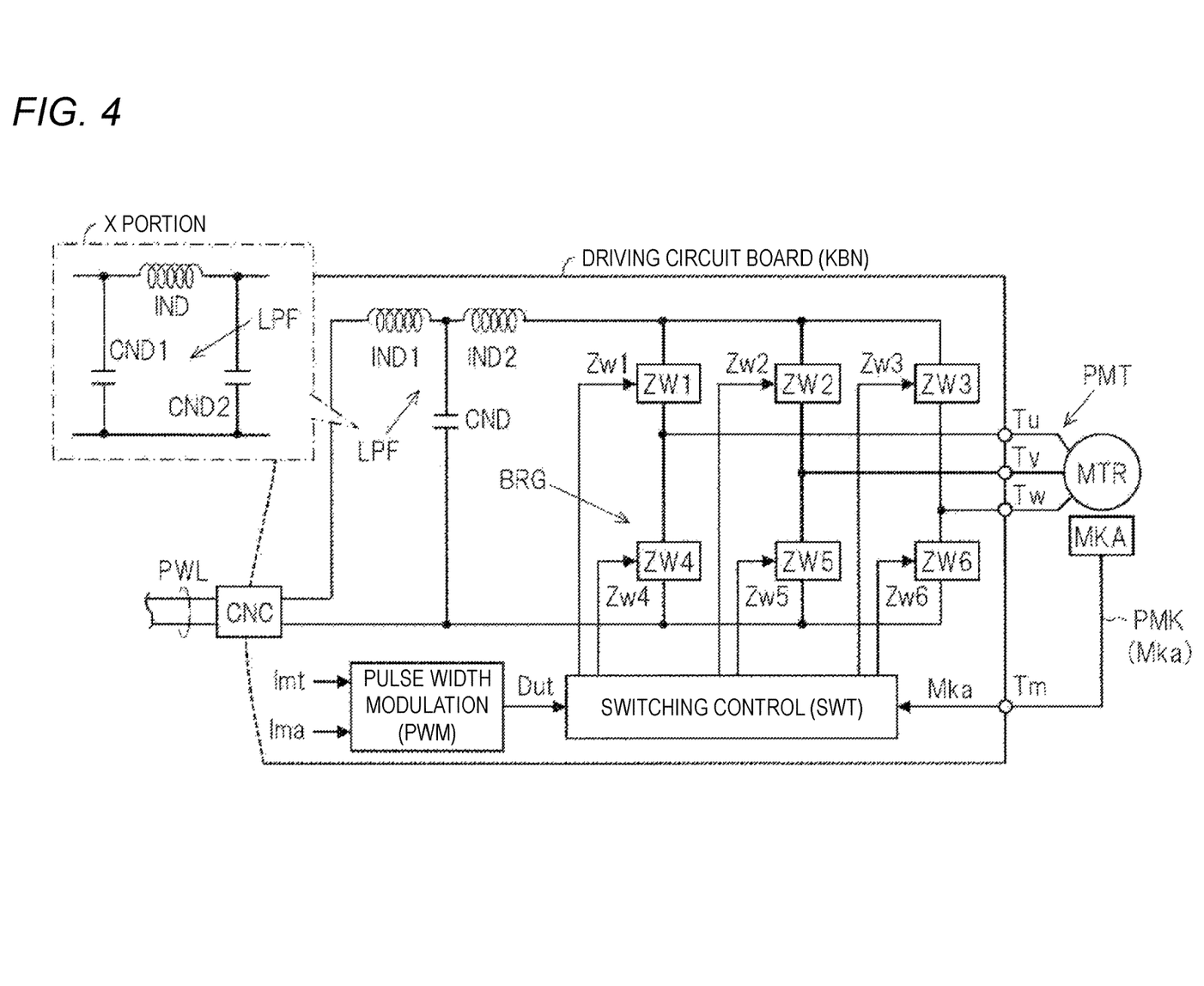
FIG. 4 A schematic diagram for explaining a second embodiment of a driving circuit board.

A second embodiment of the driving circuit board KBN will be described with reference to a schematic diagram of FIG. 4. This is an example where a brushless DC motor (three-phase brushless motor, which may simply be termed a brushless motor) is employed as the electric motor MTR. In this case, the bridge circuit BRG is configured of six switching elements ZW1 to ZW6. Here, the wheel-side communication unit CMW and the motor control calculation unit CMT are identical to the case of the brush motor, so descriptions thereof are omitted.

In the brushless motor MTR, commutation of the current is performed by the electric circuit instead of a mechanical rectifier of the brush motor. In a structure of the brushless motor MTR, a rotor (rotor) serves as a permanent magnet, and a stator (stator) serves as a coil circuit (electromagnet). Further, the rotation position (rotation angle) Mka of the rotor is detected, and the switching elements ZW1 to ZW6 are switched according to the rotation angle Mka so that the supplied current is commutated. The position of the rotor of the brushless motor MTR (rotation angle) Mka is detected by the rotation angle sensor MKA. The bridge circuit BRG configured of the switching elements ZW1 to ZW6 is implemented by the driving circuit board KBN fixed to the caliper CRP.

The connector CNC is fixed to the circuit board KBN. The signal Fbt and the electricity supplied by the signal line SGL and the power lines PWL are inputted to the circuit board KBN through the connector CNC from the electronic control unit ECU provided on the vehicle body side.

Similar to the case with the brush motor, the duty ratio (target value) Dut is calculated based on the target value Imt and the actual value Ima of the electricity amount in the pulse width modulation block PWM so as to perform the pulse width modulation. Further, the duty ratio Dut of the pulse width is determined in the pulse width modulation block PWM based on the magnitude (absolute value) of the target electricity amount Imt and the rotation direction of the electric motor MTR is determined based on the sign of the target electricity amount Imt (the value thereof being positive or negative).

Further, in the switching control block SWT, driving signals Zw1 to Zw6 for controlling a state of electric conduction/nonconduction of the switching elements ZW1 to ZW6 are calculated based on the duty ratio Dut. Here, in the brushless motor, the rotor position (rotation angle) Mka of the electric motor MTR is acquired by the rotation angle sensor MKA, based in which the signals Zw1 to Zw6 for driving the six switching elements ZW1 to ZW6 configuring the three-phase bridge circuit BRG are determined. The switching elements ZW1 to ZW6 sequentially switch directions of U-phase, V-phase, and W-phase coil electricity amounts (that is, a magnetizing direction) of the electric motor MTR, and the electric motor MTR is thereby driven. A rotation direction (forward or reverse direction) of the brushless motor MTR is determined by the relation between a position where magnetic excitation is caused and the rotor.

Similarly, of the rotation direction of the electric motor MTR, the forward direction is a rotation direction which brings the friction members MSB and the rotary member KTB closer to each other, the braking torque is increased and a degree of deceleration of the running vehicle is increased, whereas the reverse direction is a rotation direction which separates the friction members MSB away from the rotary member KTB, the braking torque is decreased, and the degree of deceleration of the running vehicle is decreased.

U-phase, V-phase, and W-phase coils of the brushless motor MTR are respectively connected electrically to the circuit board KBN (especially the through holes Tu, Tv, and Tw) by the three motor pins PMT. Further, the pins PMK of the rotation angle sensor MKA are press-fitted to the through holes Tm of the circuit board KBN and are electrically connected. The rotation angle Mka is inputted to the circuit board KBN through the pins PMK. Here, the terminal portions of the pins PMT, PMK are press-fit connectors.

In order to stabilize the supplied electricity, the circuit board KBN is provided a filter circuit (being an LC circuit, which is also called an LC filter) for noise reduction (reduction of electricity variation) formed by a combination of at least one condenser (capacitor) and at least one inductor (coil).

For example, a capacitor CND and first and second inductors IND1, IND2 are implemented on the circuit board KBN. These are combined to form a low pass filter (T-type filter) LPF, by which the noise reduction can be executed. Specifically, the T-type noise reduction circuit LPF is configured of the two serial inductors IND1, IND2 and one parallel capacitor CND, by which a harmonics attenuation performance (attenuated amount in an attenuation range) can be improved.

Further, as indicated by a balloon block of a portion X, first and second capacitors CND1, CND2 and the inductor IND may be implemented on the circuit board KBN, by which a π-type low pass filter (noise reduction filter) LPF may be formed. Specifically, the π-type low pass filter LPF is configured of two capacitors CND1, CND2 parallel to a line and one serial inductor. Generally, a condenser (capacitor) is cheaper than an inductor, so the employment of the π-type low pass filter LPF suppresses component cost, and a satisfactory noise reduction effect can be achieved.

Figure 5:
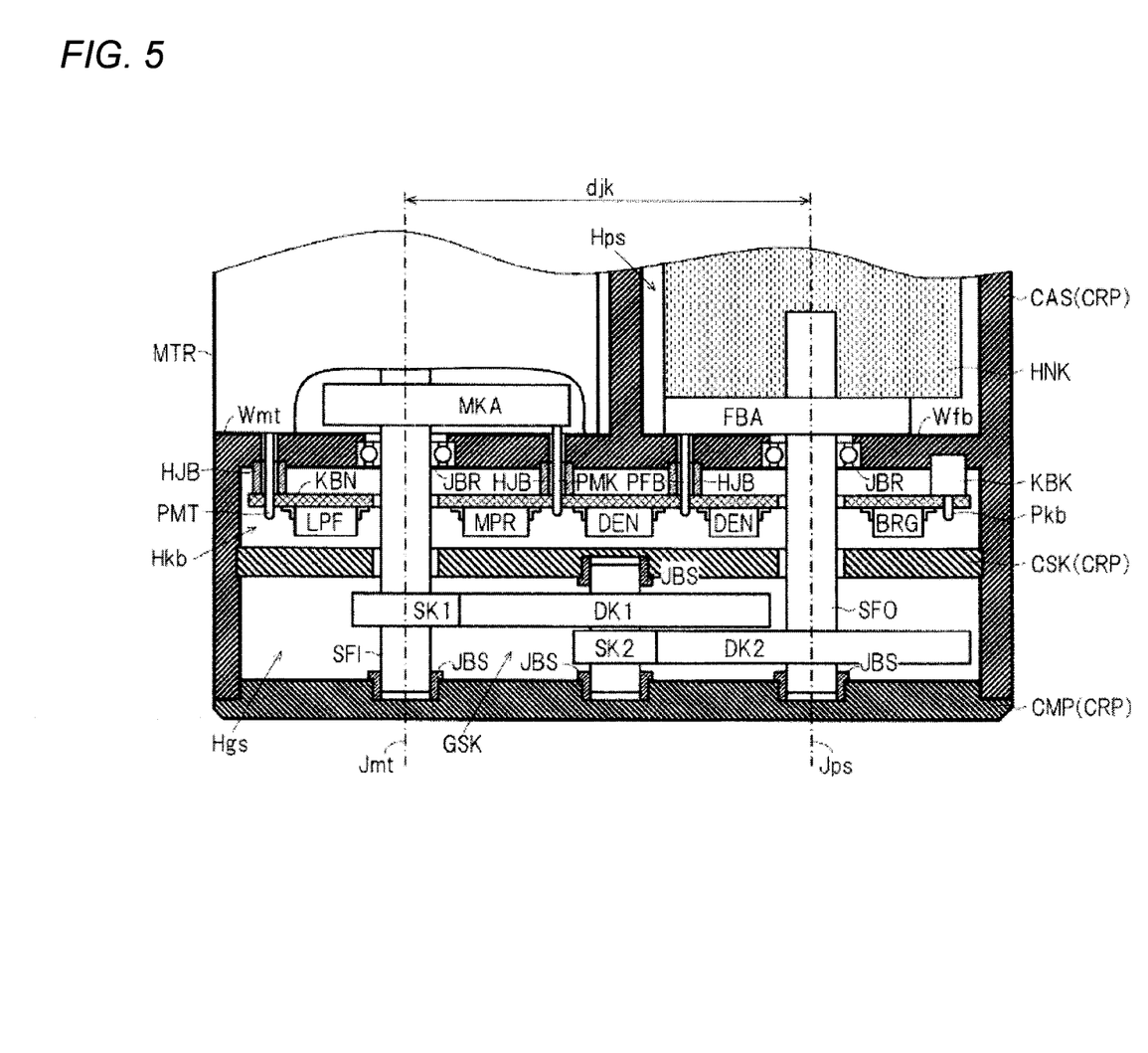
FIG. 5 A partial cross-sectional diagram for explaining a fixation state of a driving circuit board as seen along a vertical direction relative to a rotation axis of an electric motor.

Fixation State of Circuit Board KBN in Vertical Direction View Relative to Rotation Axis Jmt of Electric Motor Attachment of the circuit board KBN to the caliper CRP will be described with reference to a partial cross sectional diagram of FIG. 5. Specifically, attachment of the circuit board KBN in a view along a direction vertical to the rotation axis Jmt of the electric motor MTR will be described. Here, the rotation axis Jmt of the electric motor MTR and a rotation axis Jps of the power converting mechanism (which may simply be termed a converting mechanism) HNK are not coaxial, but are parallel and separated by a predetermined distance djk. That is, a so-called dual axis configuration in which the reduction gear GSK has two rotation axes, namely the rotation axis Jmt of the input shaft and the rotation axis Jps of the output shaft, is employed as the braking means BRK.

Other than the members (portions) to interposingly hold the rotary member KTB by the friction members MSB, the caliper CRP includes a member (portion) to arrange the electric motor MTR and the like. A member of the caliper CRP in which the electric motor MTR and the like is provided is a casing member CAS. The casing member CAS of the caliper CRP is provided with two spaces (spaces). One space is for housing the converting mechanism HNK, the pressing member PSN, and the like. This space will be termed a "pressing chamber Hps".

The electric motor MTR is fixed to an attachment wall Wmt of the casing member CAS (which is a part of the caliper CRP) via a sealing member (not shown). The input shaft SFI is fixed to the output shaft of the electric motor MTR so as to rotate together with the rotor of the electric motor MTR. The attachment wall Wmt of the casing member CAS is provided with a through hole for the input shaft SFI.

The other space is provided on an opposite side of the pressing chamber Hps with respect to the attachment wall Wmt of the casing member CAS. The circuit board KBN and the reduction gear GSK are housed herein. This space is closed by a closing member CMP via a sealing member (not shown), and is configured in a sealed state for water and dust prevention.

The space formed by the casing member CAS and the closing member CMP is partitioned into two by a partitioning member CSK (partition plate). Of the space in the casing member CAS partitioned into two, the circuit board KBN is fixed in the space on a closer side to the electric motor MTR relative to the partitioning member CSK. Further, the reduction gear GSK is provided in the space on a farther side from the electric motor MTR relative to the partitioning member CSK. The space where the circuit board KBN is housed is termed a "substrate chamber Hkb", and the space where the reduction gear GSK is housed is termed a "reduction chamber Hgs". In other words, the partitioning member CSK is a member that defines the substrate chamber Hkb and the reduction chamber Hgs. Lubricant such as grease is applied to the reduction gear GSK for lubrication, and the circuit board KBN is surrounded by the partitioning member CSK so that the lubricant does not contact the circuit board KBN.

The single circuit board KBN is fixed to the casing member CAS (which is a part of the caliper CRP) in the substrate chamber Hkb by fixation members KBK each having a round columnar shape. Specifically, one end surfaces of the fixation members KBK are fixed to the attachment wall Wmt and a pressing wall Wfb of the casing member CAS. Further, the circuit board KBN is fixed to the fixation members KBK by fixation pins (press-fit pins) Pkb on the other end faces of the fixation members KBK, where the circuit board KBN is fixed such that its surface (fpat face where the processor MPR, the bridge circuit BRG, etc. are implement) becomes vertical to the rotation axis Jmt of the electric motor MTR.

The reduction gear GSK is supported in the reduction chamber Hgs in a state of being rotatable relative to the casing member CAS and the closing member CMP. Specifically, the input shaft SFI penetrates the circuit board KBN and the partitioning member CSK, and extends to the reduction chamber Hgs. The input shaft SFI (output shaft of the electric motor MTR) is rotatably supported by the attachment wall Wmt of the casing member CAS via a bearing JBR and is rotatably supported on the closing member CMP via a bush JBS. Similarly, an intermediate shaft SFC and the output shaft SFO are supported in states of being rotatable relative to the casing member CAS and the closing member CMP by one of bearings JBR and bushes JBS. Further, gears SK1, DK1, SK2, and DK2 fixed to the input shaft SFI, the intermediate shaft SFC, and the output shaft SFO configure the reduction gear GSK.

Within the reduction chamber Hgs, a first small diameter gear SK1 that rotates integrally with the input shaft SFI is fixed to the input shaft SFI. That is, the rotation shaft of the electric motor MTR and the input shaft of the reduction gear GSK have a same axis line (coaxial). A first large diameter gear DK1 is engaged with the first small diameter gear SK1. Here, a number of teeth of the first large diameter gear DK1 is greater than a number of teeth of the first small diameter gear SK1. Thus, a combination of the first small diameter gear SK1 and the first large diameter gear DK1 decelerates rotation motion of the input shaft SFI, and torque of the input shaft SFI is thereby increased.

The first large diameter gear DK1 is fixed to the intermediate shaft SFC. Further, the intermediate shaft SFC has a second small diameter gear SK2 fixed thereto. That is, the first large diameter gear DK1 and the second small diameter gear SK2 rotate integrally. The second small diameter gear SK2 has a second large diameter gear DK2 engaged therewith. Here, a number of teeth of the second large diameter gear DK2 is greater than a number of teeth of the second small diameter gear SK2. Thus, a combination of the second small diameter gear SK2 and the second large diameter gear DK2 decelerates rotation motion of the intermediate shaft SFC, and torque of the intermediate shaft SFC is thereby increased.

The second large diameter gear DK2 is fixed to the output shaft SFO. The output shaft SFO rotates integrally with the second large diameter gear DK2, and transmits rotary power thereof to the converting mechanism HNK. Thus, the output shaft of the reduction gear GSK and an input of the converting mechanism HNK have a same axis line (coaxial). The reduction gear GSK is configured of the first small diameter gear SK1, the first large diameter gear DK1, the second small diameter gear SK2, and the second large diameter gear DK2. In other words, the reduction gear GSK executes two-step deceleration. The reduction gear GSK decelerates the rotary power of the electric motor MTR (that is, the torque of the input shaft SFI being the output torque of the electric motor MTR is increased) and is transmitted to the output shaft SFO. The output shaft SFO penetrates the partitioning member CSK, the circuit board KBN and is connected to the converting mechanism HNK. The rotary power of the output shaft SFO is transmitted to the converting mechanism HNK.

The casing member CAS (especially the attachment wall Wmt) is provided with a through hole for the input shaft SFI and through holes for the pins PMT, PMK. The input shaft SFI penetrates through the through hole of the casing member CAS. The input shaft SFI has the rotation angle sensor MKA fixed thereto.

The motor pins PMT are electrically connected to the circuit board KBN by penetrating through the holes in the casing member CAS. The motor pins PMT supply the electricity to the electric motor MTR from the circuit board KBN (especially the bridge circuit BRG) to rotationally drive the electric motor MTR. For example, the motor pins PMT have the press-fit terminals (terminals of given a gap at their distal end portions to facilitate elastic deformation) and are press-fitted to the circuit board KBN via the holding member HJB, by which the contact electric conduction is performed. The holding member HJB is a tubular member having through holes at its center portion (that is, having a penetrating cylinder shape or a shape in which a penetrating cylinder shape continues in the vertical direction to the center axis), and is for fixing the circuit board KBN to the casing member CAS. Specifically, the motor pins PMT penetrate through the through holes of the holding member HJB and thereby the distal ends of the motor pins PMT are press-fitted to the circuit board KBN. End faces of the holding member HJB and the motor pins PMT fix the circuit board KBN to the attachment wall Wmt of the casing member CAS. Here, the holding member HJB may be formed of an insulated body (nonconductive body) such as resin that does not electrically conduct.

Similarly, the rotation angle pins PMK of the rotation angle sensor MKA are electrically connected to the circuit board KBN by penetrating through the holes in the casing member CAS. The rotation angle pins PMK supply power to the rotation angle sensor MKA and transmit the detected signal (rotation angle) Mka of the rotation angle sensor MKA to the circuit board KBN (especially the processor MPR). The rotation angle pins PMK have press-fit terminals and are press-fitted to the circuit board KBN via a holding member HJB, by which the contact electric conduction is thereby performed. The holding member HJB having the tubular shape and the rotation angle pins PMK fix the circuit board KBN to the casing member CAS. Thus, the rotation angle pins PMK are given functions not only of transmitting the signal of the rotation angle Mka but also of fixing the circuit board KBN.

The pressing force sensor FBA is provided between the pressing wall Wfb of the casing member CAS and the converting mechanism HNK. The pressing force sensor FBA detects the pressing force Fba being a force by which the friction members MSB press the rotary member KTB. The pressing force pins PFB of the pressing force sensor FBA penetrate through the holes in the casing member CAS (especially the pressing wall Wfb) and are electrically connected to the circuit board KBN. The pressing force pins PFB supply the electricity to the pressing force sensor FBA and transmit the detected signal (pressing force) Fba of the pressing force sensor FBA to the circuit board KBN (especially to the processor MPR). The pressing force pins PFB have press-fit terminals and are press-fitted to the circuit board KBN via a holding member HJB, by which the contact electric conduction is thereby performed. The holding member HJB having the tubular shape and the pressing force pins PFB fix the circuit board KBN to the casing member CAS. Thus, the pressing force pins PFB are given functions not only of transmitting the signal of the pressing force Fba but also of fixing the circuit board KBN.

The dual-axis configuration arranges the electric motor MTR and the converting mechanism HNK close to the circuit board KBN. Due to this, the pins PMT, PMK, and PFB are press-fitted to the circuit board KBN by penetrating through the holding members HJB and may be used in the fixation of the circuit board KBN. Here, straight pins (pins having a linear longitudinal shape) may be employed as the pins PMT, PMK, and PFB. The circuit board KBN can be fixed more firmly to the casing member CAS by the holding members HJB and the pins PMT, PMK, and PFB in addition to the fixation members KBK. As a result, resonance phenomenon generated by warping and the like of the circuit board KBN is suppressed, and vibration resistance of the actuator BRK can be improved.

Figure 6:
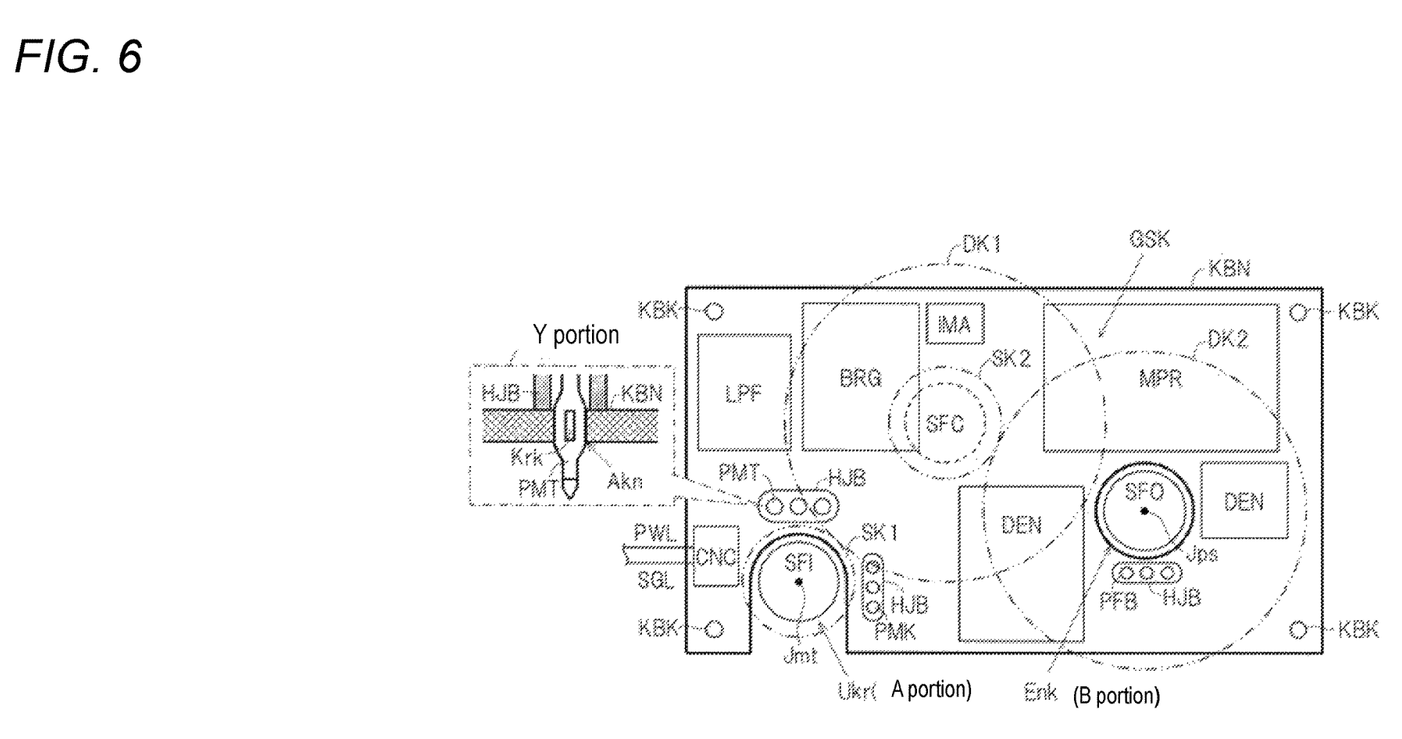
FIG. 6 An arrangement diagram for explaining the fixation state of the driving circuit board as seen along a parallel direction relative to the rotation axis of the electric motor.

Fixation State of Driving Circuit Board KBN in Parallel Direction View Relative to Rotation Axis Jmt of Electric Motor Attachment of the circuit board KBN (in a view along a direction parallel to the rotation axis Jmt of the electric motor) will be described with reference to an arrangement diagram of FIG. 6. Here, the circuit board KBN is a one sheet of printed substrate, and four corners thereof are fixed to the caliper CRP (especially the casing member CAS) by the fixation members KBK.

Firstly, the electronic components implemented on the circuit board KBN being a single sheet of printed substrate will be described. The connector CNC is fixed to the circuit board KBN. The signal transmission and reception and electricity supply with the ECU on the vehicle body side are performed through the connector CNC. Further, the circuit board KBN is provided with the microprocessor MPR for executing various calculation processes, the bridge circuit BRG (assembly of switching elements) for driving the electric motor MTR, the noise reduction circuit LPF for stabilizing power voltage, and other electronic components DEN are implemented (see FIGS. 2 and 4).

As illustrated by a balloon block Y in a one-dot chain line, the circuit board KBN is provided with through holes (through holes) Akn. The motor pins PMT for the electric motor MTR penetrate through the holding member HJB and are press-fitted in the through holes Akn. As the terminal shape of the motor pins PMT, the terminals for press fitting connection are employed. Here, the press fitting connection means to press fit a terminal that is somewhat wider than a through hole (through hole) of the circuit board KBN to generate contact load between the pin and the through hole obtain electric contact therebetween. Thus, the press-fitting terminals (through hole insertion portions) of the motor pins PMT have the deformable structure (for example, a structure having cutouts Krk).

The circuit board KBN is fixed to the caliper CRP (casing member CAS) by the holding member HJB and the motor pins PMT. Specifically, the holding member HJB is formed of an electrically insulated material, and has a penetrating tube shape (a penetrating cylinder shape or a shape in which it continues in a planar direction of the substrate). The motor pins PMT are press-fitted to the circuit board KBN through the through holes of the holding member HJB and, and the circuit board KBN is thereby fixed. Similarly, the circuit board KBN is fixed to the caliper CRP by the holding member HJB and the rotation angle pins PMK, as well as the holding member HJB and the pressing force pins PFB. Here, the rotation angle pins PMK and the pressing force pins PFB also have press-fit terminals similar to the motor pins PMT (see a portion Y).

The circuit board KBN is fixed to the caliper CRP at its four corners by the fixation members KBK, and is in addition fixed by the pins PMT, PMK, and PFB. The fixation by the pins PMT, PMK, and PFB are performed inside a square formed by the four fixation members KBK (more precisely, by center axis lines of the fixation members KBK) (as seen in the parallel direction of the rotation axis Jmt). Thus, the warping of the circuit board KBN caused by vibration input to the wheel can thereby be reduced, and reliability of the braking means BRK against vibration can be improved. At least one of the four fixation members KBK at the four corners may be omitted.

The circuit board KBN is arranged between the electric motor MTR and the converting mechanism HNK and the reduction gear GSK. Due to this, the circuit board KBN needs to be in a shape by which the input shaft SFI for transmitting the power from the electric motor MTR to the reduction gear GSK and the output shaft SFO for transmitting the power from the reduction gear GSK to the converting mechanism HNK can be penetrated therethrough. Thus, for example, the circuit board KBN is provided with a cutout shape as shown in a portion A (for example, a U-shaped cutout) or a hole shape (for example, a round hole) as shown in a portion B. To present specific examples, the input shaft SFI penetrates the circuit board KBN at a U-shaped cutout Ukr and connects the electric motor MTR with a first small diameter gear SK1. Further, the output shaft SFO penetrates through a round hole Enk, and connects a second large diameter gear DK2 and the converting mechanism HNK. That is, the circuit board KBN is provided with at least one of a hole (not being limited to a round shape) and a cutout (not being limited to a U shape), and the power from the electric motor MTR is transmitted to the reduction gear GSK through the circuit board KBN. Further, this power again passes through the circuit board KBN, and is transmitted from the reduction gear GSK to the converting mechanism HNK.

A relationship between the circuit board KBN and the reduction gear GSK (especially in a case of seeing the reduction gear GSK from a vertical direction relative to the circuit board KBN) will be described. The aforementioned arrangement is employed regarding the circuit board KBN and the reduction gear GSK to make the electric braking device DSS compact. Due to this, when the reduction gear GSK is projected against the circuit board KBN (that is, in seeing the reduction gear GSK from the direction parallel to the rotation axis Jmt and vertical to the surface of the circuit board KBN), an entirety of the reduction gear GSK is projected substantially on the circuit board KBN. For example, the reduction gear GSK is projected onto the driving circuit board KBN, being a one sheet of printed substrate, over 70% or more of an area thereof. According to such a configuration, the electric braking device DSS is made compact, and improvement in its mountability to the vehicle can be achieved.

Workings and Effects

As mentioned above, the rotary output of the electric motor MTR is decelerated by the reduction gear GSK and is outputted to the power converting mechanism HNK (for example, a screw mechanism). Thus, the output torque of the electric motor MTR is increased and transmitted to the converting mechanism HNK. The rotation axis Jmt of the input shaft (which matches the rotation axis of the electric motor MTR) SFI of the reduction gear GSK and the rotation axis Jps of the output shaft (which matches the input shaft of the converting mechanism HNK) SFO of the reduction gear GSK are parallel and are arranged apart from each other at a distance (predetermined distance djk) (called "dual axis configuration" due to having two rotation axes).

When seen from the vertical direction to the rotation axes Jmt, Jps, the circuit board KBN (one sheet of printed substrate) is located in between the "electric motor MTR, rotation angle sensor MKA" and the "reduction gear GSK". Further, when seen from the vertical direction to the rotation axes Jmt, Jps, the circuit board KBN (one sheet of printed substrate) is located in between the "converting mechanism HNK and pressing force sensor FBA" and the "reduction gear GSK". Further, the implemented surface of the circuit board KBN (the flat surface where the processor MPR, the bridge circuit BRG, the noise reduction circuit LPF, and the like are implemented) is arranged parallel to the rotation axes Jmt, Jps. In this arrangement, at least one of the input shaft SFI and the output shaft SFO penetrates the circuit board KBN.

To drive the electric motor MTR, the power is supplied to the electric motor MTR from the circuit board KBN through the motor pins PMT. The power is supplied from the circuit board KBN through the rotation angle pins PMK and the pressing force pins PFB to the rotation angle sensor MKA and the pressing force sensor FBA for detecting the rotation angle Mka and the pressing force Fba. Further, the detected values Mka, Fba of the rotation angle sensor MKA and the pressing force sensor FBA are inputted to the circuit board KBN through the pins PMK, PFB. That is, the power supply and the signal transmission and reception are performed by the pins PMT, PMK, and PFB.

The press-fit terminals of the pins PMT, PMK, and PFB penetrate the holding members HJB and are press-fitted to the circuit board KBN. That is, the fixation of the circuit board KBN and the caliper CRP is performed by the holding members HJB and the pins PMT, PMK, and PFB. The circuit board KBN is fixed to the caliper CRP by the fixation members KBK, and further, it is attached to the caliper CRP by the fixation implemented by these holding members HJB by a simple configuration with enhanced sturdiness. Due to this, vibration resistance of the circuit board KBN itself and electronic components (such as the processor MPR, etc.) implemented thereon can be improved.

Fixation State of Circuit Board KBN (in Vertical Direction View Relative to Rotation Axis Jmt)

Figure 7:
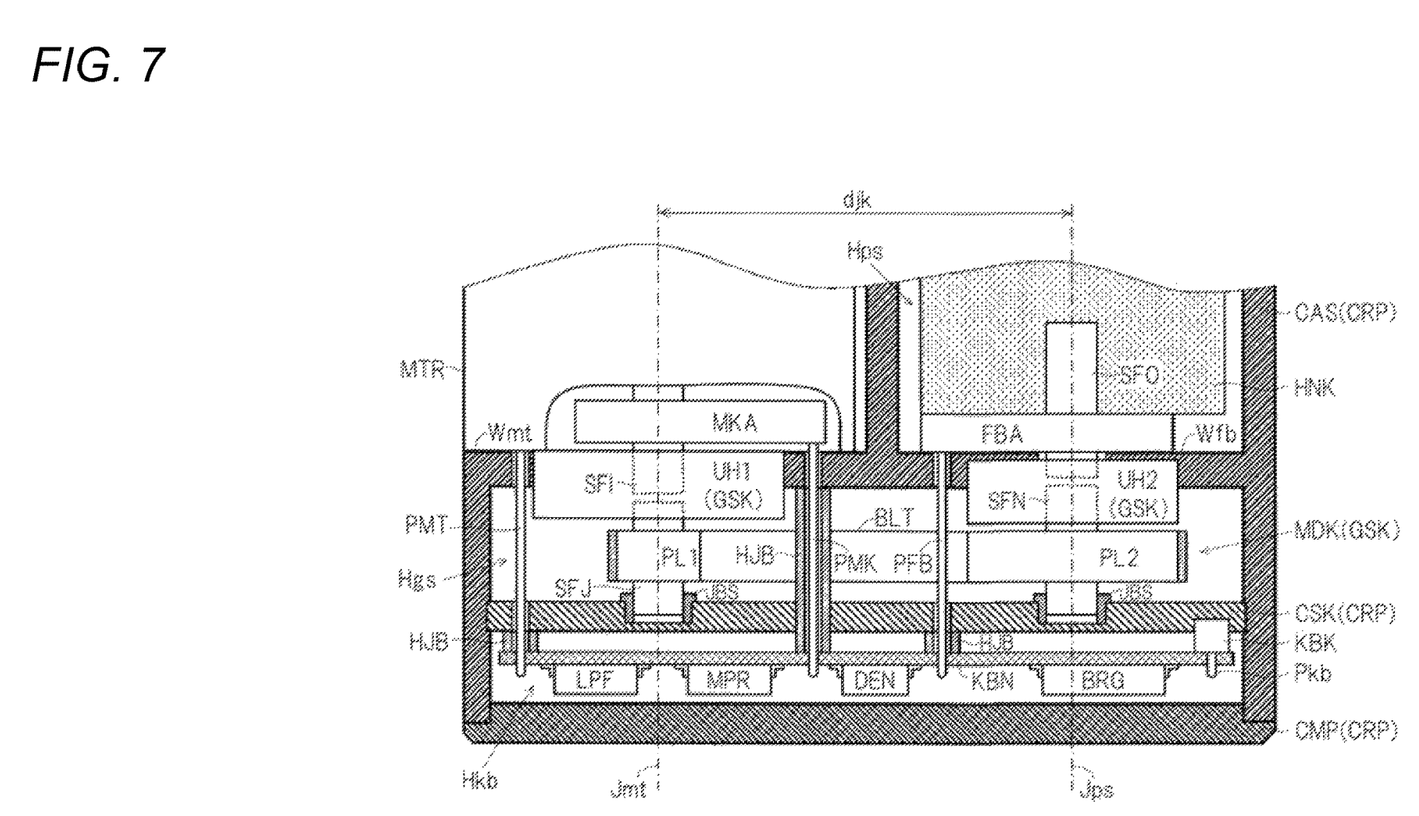
FIG. 7 A partial cross-sectional diagram for explaining another fixation state of the driving circuit board.

Another attachment of the circuit board KBN to the caliper CRP will be described with reference to a partial cross sectional diagram of FIG. 7. In FIG. 5, the substrate chamber Hkb is formed on the closer side to the electric motor MTR and the converting mechanism HNK, and the reduction chamber Hgs is formed on the farther side therefrom relative to the partitioning member CSK. Contrary to this, in FIG. 7, the substrate chamber Hkb is formed on the farther side from the electric motor MTR and the converting mechanism HNK, and the reduction chamber Hgs is formed on the closer side thereto relative to the partitioning member CSK. Further in FIG. 5, the two-step gear reduction mechanism is employed as the reduction gear GSK, however, in FIG. 7, planetary gear mechanisms UH1, UH2 and a belt transmission mechanism MDK are employed. Hereinbelow, differences from FIG. 5 will mainly be described.

The input shaft SFI (output shaft of the electric motor MTR) is fixed to a sun gear of the motor shaft-side planetary gear mechanism UH1, and a first pulley shaft SFJ is fixed to a carrier of the motor shaft-side planetary gear mechanism UH1. A small diameter pulley PL1 is fixed to the first pulley shaft SFJ, and power is decelerated by a large diameter pulley PL2 via a belt BLT and thereby transmitted. The large diameter pulley PL2 is fixed to a second pulley shaft SFN, and the second pulley shaft SFN is fixed to a sun gear of a pressing shaft-side planetary gear mechanism UH2. The power is inputted to the converting mechanism HNK from the output shaft SFO fixed to a carrier of the pressing shaft-side planetary gear mechanism UH2. That is, the output of the electric motor MTR is decelerated by the motor shaft-side planetary gear mechanism UH1, the belt transmission mechanism MDK, and the pressing shaft-side planetary gear mechanism UH2 and then transmitted to the converting mechanism HNK.

The four corners of the circuit board KBN is fixed to the partitioning member CSK (a part of the caliper CRP) by the four fixation members KBK. In addition to this, the press-fit terminals of the pins PMT, PMK, and PFB and the holding members HJB fix the circuit board KBN to the partitioning member CSK. The circuit board KBN is fixed not only by the fixation members KBK but also by the pins PMT and the like, and as such, same effect can be achieved in the configuration of FIG. 7 as that of the configuration of FIG. 5. That is, since the holding members HJB and the pins (PMT, etc.) function as members for fixing the electric circuit board KBN to the caliper CRP, a large number of fixation members KTB are not necessary, by which the fixation of the circuit board KBN can be simplified, and it can be fixed to the caliper CRP with enhanced sturdiness. Similar to the above, in this configuration as well, at least one of the four fixation members KBK may be omitted.

The invention claimed is:
1. An electric braking device for a vehicle, the device comprising:
   an electric motor configured to generate a pressing force in accordance with an operation amount of a braking operation member by a driver of the vehicle, the pressing force being a force for pressing a friction member against a rotary member that rotates integrally with a wheel of the vehicle;
   a caliper configured to fix the electric motor;

a circuit board configured to implement a microprocessor and a bridge circuit so as to drive the electric motor; and a motor pin configured to supply power to the electric motor from the circuit board, wherein the motor pin penetrates through a holding member and is press-fitted to the circuit board, the holding member being formed of an electrically insulating material, and the circuit board is fixed to the caliper by the holding member and the motor pin.

2. An electric braking device for a vehicle, the device comprising:

an electric motor configured to generate a pressing force in accordance with an operation amount of a braking operation member by a driver of the vehicle, the pressing force being a force for pressing a friction member against a rotary member that rotates integrally with a wheel of the vehicle;

a caliper configured to fix the electric motor;

a pressing force sensor configured to detect the pressing force;

a circuit board configured to implement a microprocessor and a bridge circuit so as to drive the electric motor based on the pressing force; and a pressing force pin configured to send a signal of the pressing force to the circuit board from the pressing force sensor and to supply power to the pressing force sensor from the circuit board, wherein the pressing force pin penetrates through a holding member and is press-fitted to the circuit board, the holding member being formed of an electrically insulating material, and the circuit board is fixed to the caliper by the holding member and the pressing force pin.

3. An electric braking device for a vehicle, the device comprising:

an electric motor configured to generate a pressing force in accordance with an operation amount of a braking operation member by a driver of the vehicle, the pressing force being a force for pressing a friction member against a rotary member that rotates integrally with a wheel of the vehicle;

a caliper configured to fix the electric motor;

a rotation angle sensor configured to detect a rotation angle of the electric motor;

a circuit board configured to implement a microprocessor and a bridge circuit so as to drive the electric motor based on the rotation angle; and a rotation angle pin configured to send a signal of the rotation angle to the circuit board from the rotation angle sensor and to supply power to the rotation angle sensor from the circuit board, wherein the rotation angle pin penetrates through a holding member and is press-fitted to the circuit board, the holding member being formed of an electrically insulating material, and the circuit board is fixed to the caliper by the holding member and the rotation angle pin.

* * * * *